United States Patent Office 3,072,414
Patented Jan. 8, 1963

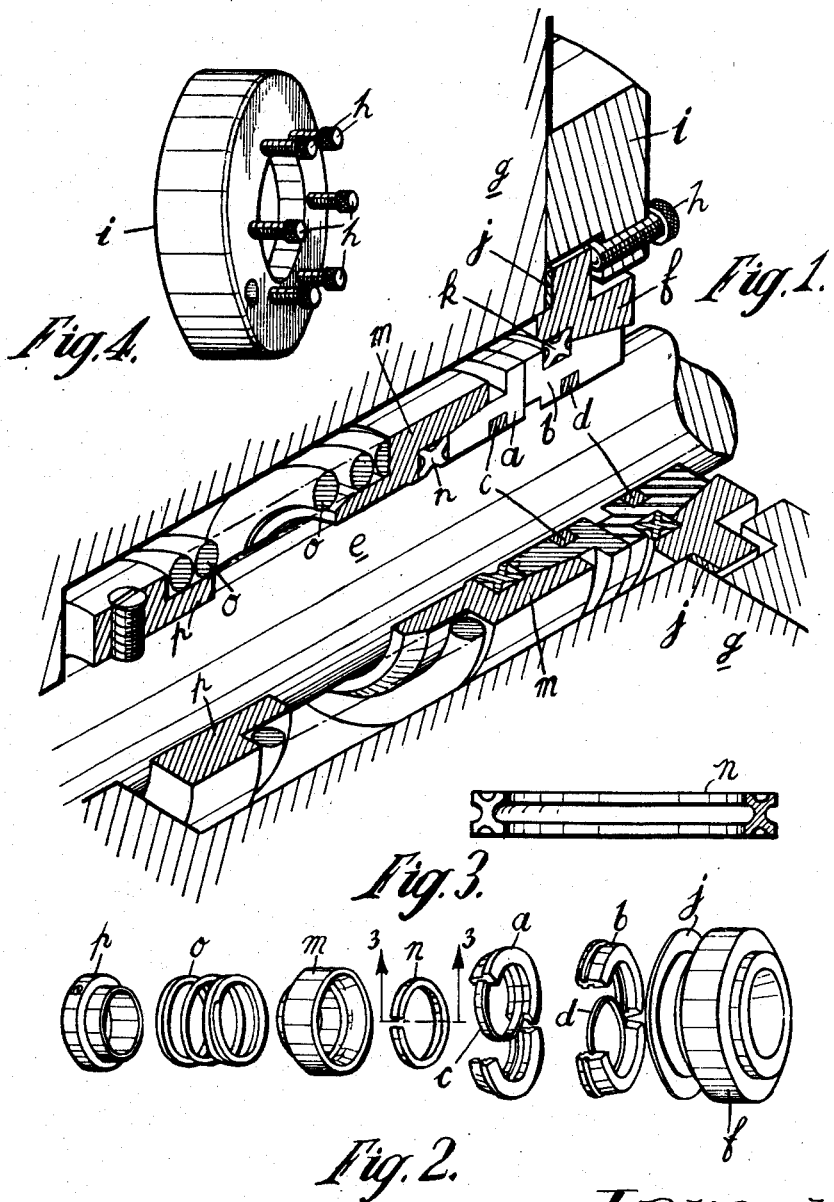

3,072,414
MECHANICAL SEALS FOR ROTATING PARTS
Frederick B. Porges, Hale Barns, England, assignor to Flexibox Limited, Manchester, Lancashire, England, a British company
Filed June 27, 1960, Ser. No. 39,177
Claims priority, application Great Britain July 16, 1959
5 Claims. (Cl. 277—93)

This invention relates to mechanical seals for making a sealing joint between relatively rotating elements, the seal comprising stationary and revolving seal rings pressed against one another by spring means.

In certain condition, particularly where the equipment being sealed is large and heavy or where it would be particularly inconvenient for other reasons for the equipment to be stripped sufficiently for the fitting of conventional mechanical seals, it is desirable that the parts of the mechanical seal which are subject to wear and deterioration should be split so that they can be assembled around the shaft with only a minimum amount of disassembly being necessary. In such circumstances it has been usual to employ clamping arrangements for holding the split parts together.

The object of the present invention is to provide an improved construction of mechanical seal employing split seal rings.

The invention consists in a mechanical seal for making a sealing joint between relatively rotating elements, the seal comprising stationary and rotary seal rings pressed against one another by spring means, characterised in this that each seal ring is split axially into two similar half rings, each complete seal ring being assembled about a one piece locating ring which fits into an annular recess within the split ring.

The invention further comprises a mechanical seal as aforesaid in which the stationary and rotary seal ring assemblies each comprises a seal ring split axially into two similar half rings assembled about one piece locating ring, and a seal ring body, each seal ring and its body having internal and external tapered surfaces where they engage one another, and a spring pressing each seal ring onto its body and the two seal rings against each other.

The invention further comprises a mechanical seal as aforesaid in which a spring presses the rotary seal ring body against and drives the rotary seal ring, and presses the latter against the stationary seal ring which presses upon the stationary seal ring body, which is secured to a stuffing box around the rotary shaft along which the mechanical seal is made.

The invention further comprises a mechanical seal as aforesaid in which a split packing ring of cruciform section is interposed between one or both of the seal rings and their respective bodies.

Referring to the accompanying explanatory drawings:
FIGURE 1 is a sectional view of one form of mechanical seal incorporating split seal rings arranged and constructed in accordance with the present invention.
FIGURE 2 comprises the several parts constituting the mechanical seal shown in FIGURE 1, such parts being shown in exploded form.
FIGURE 3 is a sectional view drawn to an enlarged scale on the line 3—3 of one of the parts shown in FIGURE 2.
FIGURE 4 is a perspective end view of the seal plate shown in FIGURE 1 through which set screws are threaded to secure in position the stationary seal ring body.

The two seal rings $a$ and $b$ are split into two similar half rings as shown in FIGURE 2. Each complete seal ring is assembled about a one-piece locating ring $c$, $d$ which fits into an annular recess provided in the interior of each half of the seal rings $a$, $b$. These rings and the locating rings $c$, $d$ surround the shaft $e$ with which the rotary seal ring $a$ rotates. The stationary seal ring $b$ is a taper fit in the stationary seal ring body $f$ which is held in position by set screws $h$ threading through a seal plate $i$ bolted to the housing or stuffing box $g$. The arrangement of the seal plate $i$ with its several set screws $h$ which can be individually adjusted enables the rubbing face of the stationary seal ring to be accurately aligned without distortion in a plane at right angles to the shaft $e$. A gasket $j$ is provided between the stationary seal ring body $f$ and the housing or stuffing box $g$ to prevent leakage from said housing or stuffing box to the outside.

A split packing ring $k$ of cruciform section may be provided between the stationary seal ring $b$ and the stationary seal ring body $f$.

The split rotary seal ring $a$ is a taper fit in the rotary seal ring body $m$, there being a split packing $n$ as shown in FIGURE 3 between adjacent shoulders of the rotary seal ring $a$ and the rotary seal ring body $m$ to prevent leakage along the shaft $e$.

Pressure between the seal faces is supplied by the coil spring $o$ which bears at one end on the sleeve $p$ secured to the shaft $e$ and at the other end on the rotary seal ring body $m$ which it drives positively. This positive drive relieves the packing $n$ of frictional wear.

It will be noted that those parts of the rotary and stationary seal ring assembly subject to wear, namely the parts $a$ and $b$, are each split into two parts, and each part is assembled about a one-piece locating ring which fits into an annular recess provided in the interior of each half ring of each seal ring means, so that the split parts are correctly located and held in place against relative axial movement. In addition, the various components of the sealing assembly can be quickly and easily dismounted and replaced. The rotary seal ring packing $n$ and, if provided, the stationary seal ring packing $k$, is split in one place for ease of replacement.

If desired cooling liquid can be circulated around the rotary and stationary seal rings where they interengage.

The construction and arrangement of the securing means for the stationary seal ring assembly is as described in my co-pending U.S. patent application, Serial No. 8,758, now Patent No. 3,051,498, filed February 15, 1960, and entitled "Mechanical Seals."

What is claimed is:
1. A sealing assembly for effecting a sealing joint between relatively rotating elements comprising stationary and rotatable seal ring means having facing cooperating planar sealing surfaces, spring means for pressing said ring means and thus said surfaces against one another, each seal ring means comprising two similar half rings, each half ring having an annular recess in the interior thereof positionable in transverse alignment whereby when the half rings are against one another a continuous internal groove is defined by the recesses, a continuous locating ring for each ring means and said locating rings fitting within said grooves in the interior of the half rings of each ring means so as to correctly locate said half rings and prevent relative axial movement thereof.
2. A sealing assembly as claimed in claim 1 and a seal ring body for each seal ring means, the respective seal ring means and associated seal ring body having facing, cooperating internal and external tapered surfaces in overlapping engagement and said spring means having one end fixed to the rotatable element and its other end operatively related with the rotatable seal ring means to press the same against said stationary seal ring means and thereby hold the seal ring means against one another and the stationary seal ring means against the associated stationary seal ring body.
3. A sealing assembly for effecting a sealing joint between an apertured plate and a rotatable shaft extending therethrough, comprising a stuffing box surrounding the shaft and secured to the plate, a stationary seal ring body secured to the stuffing box and having an internal tapered surface, a stationary seal ring means having an external tapered surface complementary to the internal tapered surface of the stationary seal ring body, said stationary seal ring means comprising two similar half rings, each having a similar internal groove therein, a continuous locating ring surrounding the shaft and having a cross-sectional dimension corresponding to the cross-section of the grooves and positioned in the grooves in the stationary half rings to prevent relative axial displacement thereof, said stationary half rings having planar sealing surfaces extending transversely of said shaft, a rotatable seal ring means comprising two half rings each having a similar internal groove therein, another continuous locating ring having its cross-section corresponding to that of the grooves and fitting within the grooves of the rotatable half rings to prevent relative axial displacement thereof, said rotatable half rings having planar sealing surfaces extending transversely of the shaft for making a sealing engagement with the sealing surfaces of the stationary half rings, said rotatable half rings also having an external tapered surface extending away from said sealing surfaces, a rotatable seal ring body surrounding said shaft and having a portion thereof overlapping said rotatable half ring and which portion has its internal surface tapered to provide a wedge fit over the external tapered surfaces of said rotatable half rings, and a spring having one end operably connected with the shaft and its other end pressing the rotatable seal ring body against the rotatable seal ring means for driving the latter and pressing the sealing surfaces against one another.

4. A sealing assembly as claimed in claim 3 and a split packing ring of cruciform section surrounding said shaft and interposed between said rotatable seal ring means and the rotatable seal ring body.

5. A sealing assembly as claimed in claim 3 and a split packing ring of cruciform section interposed between the stationary seal ring means and the stationary seal ring body.

References Cited in the file of this patent
UNITED STATES PATENTS

| | | |
|---|---|---|
| 542,137 | Braden | July 2, 1895 |
| 2,921,806 | Carter | Jan. 19, 1960 |